Patented Sept. 30, 1941

2,257,711

UNITED STATES PATENT OFFICE 2,257,711

INSECTICIDE

Ivor M. Colbeth, East Orange, N. J., assignor to The Baker Castor Oil Company, New York, N. Y., a corporation of New Jersey No Drawing. Application August 31, 1938, Serial No. 227,687

4 Claims. (Cl. 167—22)

This invention relates to an insecticide that can be safely used and can be economically prepared in large quantities and kept in storage for an indefinitely long time until there is need for its use. The product may be prepared from castor oil and is non-poisonous to humanity and does not cause burns when brought into contact with the skin.

The material has volatile constituents therein although its vapor pressure is low so that it does not become rapidly dissipated in the air when it is exposed to attract insects or plant pests.

The material contains undecylenic acid and heptaldehyde. It can be conveniently prepared by dry distilling castor oil at atmospheric pressure at temperatures between about 260° C. and about 300° C. until approximately 50% of its weight is lost. The portion that is distilled is condensed and constitutes the material that is to be used as an insecticide. When obtained in this way it is made up of about 45% of undecylenic and about 55% of heptaldehyde together with a very small amount of unknown by-products whose presence does not seem to be necessary in order to make the material useful as an insecticide.

This material may be used in the usual ways that insecticides are used for destroying insects or pests. It has been found to be particularly useful for getting rid of Japanese beetles and other winged insects since they are strongly attracted by the odor of the material. When the material is placed, for example, in an ordinary type of beetle trap such as an open vessel with baffles above the liquid, the insects are attracted by the odor and when they approach the bait and hover over the liquid, the concentrated vapors seem to paralyze them and they consequently fall into the liquid and perish.

The material is soluble in hydrocarbons. It can be dissolved in low-boiling hydrocarbons such as gasoline, for example, and can then be sprayed on cattle, trees, vegetables, etc., to destroy the pests. The cattle are not injured and the residue left on fruit, flowers, etc., is non-toxic and can be washed off when found to be unpleasant to the taste of the users.

What is claimed is:

1. An insecticide comprising the distillate obtained by dry distilling castor oil at a temperature between 260° C. and 300° C.

2. An insecticide comprising the distillate obtained by dry distilling castor oil at a temperature between 260° C. and 300° C. until approximately half of its weight is lost.

3. The process of destroying insect pests which comprises contacting them with the distillate obtained from castor oil by dry distilling it at temperatures between 260° C. and 300° C.

4. The process of destroying insect pests which comprises contacting them with the distillate obtained from castor oil by dry distilling it at temperatures between 260° C. and 300° C. until about half of its weight is lost.

IVOR M. COLBETH.